United States Patent [19]
Furusawa

[11] Patent Number: 5,898,651
[45] Date of Patent: *Apr. 27, 1999

[54] OBJECTIVE LENS ACTUATOR ASSEMBLY FOR AN OPTICAL DISK DRIVE

[75] Inventor: Kouji Furusawa, Tokyo, Japan

[73] Assignee: NEC Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/783,341

[22] Filed: Jan. 16, 1997

[30] Foreign Application Priority Data

Jan. 19, 1996 [JP] Japan .................................. 8-006932

[51] Int. Cl.$^6$ .................................................. G11B 7/095
[52] U.S. Cl. ........................................ 369/44.14; 369/44.27
[58] Field of Search .............................. 369/44.14, 44.15, 369/44.16, 44.17, 44.18, 44.19, 44.21, 112, 94; 359/812, 813, 814, 823, 824

[56] References Cited

U.S. PATENT DOCUMENTS

| 5,721,723 | 2/1998 | Uchimaru et al. | 369/44.15 |
|---|---|---|---|
| 5,729,510 | 3/1998 | Kasahara et al. | 369/44.14 |

FOREIGN PATENT DOCUMENTS

| 0727776 A1 | 8/1996 | European Pat. Off. . |
| 0033343 | 2/1987 | Japan . |
| 8138265 | 5/1996 | Japan . |
| 9138956 | 5/1997 | Japan . |
| 9180218 | 7/1997 | Japan . |

OTHER PUBLICATIONS

K. Nakamura, et al., "Development of Twin Lens Optical Pick–Up for DVD", Technical Report, the Institute of Television Engineers of Japan, 1995, vol. 46 (VIR95–46), pp. 53–60.
Nikkei Mechanical, "Switching VD/CD Lenses", Aug. 7, 1995, vol. 460, pp. 62–65.

*Primary Examiner*—Thang V. Tran
*Attorney, Agent, or Firm*—Ostrolenk, Faber, Gerb & Soffen, LLP

[57] ABSTRACT

In an optical disk drive selectively operable with different kinds of optical disks, an objective lens actuator assembly includes a plurality of objective lenses each assigned to a particular kind of optical disk for converging a laser beam issuing from a light source onto the recording surface of the optical disk. A disk-like lens holder supports the objective lenses on a single circle thereon. A chassis supports the lens holder such that the holder is freely rotatable and freely movable back and forth along its axis of rotation. A focusing actuator is mounted on the chassis for causing the lens holder to move along the axis of rotation. A tracking actuator causes the lens holder to rotate for thereby positioning the lenses. The tracking actuator has a single tracking coil affixed to the circumferential edge of the lens holder, and a plurality of magnets each attracting or repulsing the coil when current is fed to the coil. The magnets adjoin the circumferential edge of the lens holder and are mounted on the chassis in association with the lenses.

17 Claims, 4 Drawing Sheets

OBJECTIVE LENS ACTUATOR ASSEMBLY FOR AN OPTICAL DISK DRIVE

BACKGROUND OF THE INVENTION

The present invention relates to an optical disk drive selectively operable with different kinds of optical disks and, more particularly, to an objective lens actuator assembly advantageously applicable to such an optical disk drive.

An objective lens actuator assembly for the above application is disclosed in "Development of Twin Lens Optical Pick-up for DVD", Technical Report, the Institute of Television Engineers of Japan, 1995, Vol. 46 (VIR95-46), pp. 53–60, and "Switching VD/CD Lenses", Nikkei Mechanical, Aug. 7, 1995, Vol. 460, pp. 62–65. The actuator assembly is built in an optical disk drive selectively operable with a CD (Compact Disk) or a DVD (Digital Video Disk), as desired. While CDs and DVDs share the same principle of playing, they are different in specifications including thickness. To allow a single optical disk drive to read information out of the two different kinds of optical disks, it is necessary to provide the disk drive with two different kinds of objective lenses (one for converging a laser beam issuing from a light source onto a CD and the other for converging it onto a DVD).

In the above conventional actuator assembly, two objective lenses assigned to DVDs and CDs, respectively, are mounted on a disk-like lens holder. The lens holder is rotatable about a shaft and movable back and forth in the direction parallel to the shaft. The actuator assembly includes a tracking actuator, a focusing actuator, and an operation control circuit. The focusing actuator causes the lens holder to move in the direction parallel to the shaft. The tracking actuator has a plurality of tracking coils mounted on the lens holder and causes the lens holder to rotate about the shaft for thereby positioning the objective lenses. The tracking actuator is capable of correcting a tracking error and replacing the objective lens at the same time.

However, the conventional actuator assembly has some issues yet to be solved, as follows. The tracking coils must be mounted on the lens holder in accordance with the number of objective lenses, increasing the overall weight of the lens holder. As a result, power consumption by the tracking actuator is increased, and the operation speed is lowered. Moreover, control for the tracking error correction and lens replacement must be executed with each of the two pairs of tracking coils, resulting in the need for two pairs of operation control circuits and two pairs of tracking coil switching circuits. This undesirably complicates the configuration of the overall operation control circuitry.

SUMMARY OF THE INVENTION

It is therefore an object of the present invention to provide an objective lens actuator assembly for an optical disk drive which is capable of saving power to be consumed by a tracking actuator, and enhancing high-speed operation to thereby reduce the reading time.

In accordance with the present invention, in an optical disk drive selectively operable with different kinds of optical disks, an objective lens actuator assembly includes a plurality of objective lenses each assigned to a particular kind of optical disk for converging a laser beam issuing from a light source onto the recording surface of the optical disk. A disk-like lens holder supports the objective lenses on a single circle thereon. A chassis supports the lens holder such that the holder is freely rotatable and freely movable back and forth along its axis of rotation. A focusing actuator is mounted on the chassis for causing the lens holder to move along the axis of rotation. A tracking actuator causes the lens holder to rotate for thereby positioning the lenses. The tracking actuator has a single tracking coil affixed to the circumferential edge of the lens holder, and a plurality of magnets each attracting or repulsing the coil when current is fed to the coil. The magnets adjoin the circumferential edge of the lens holder and are mounted on the chassis in association with the lenses.

BRIEF DESCRIPTION OF THE DRAWINGS

The above and other objects, features and advantages of the present invention will become apparent from the following detailed description taken with the accompanying drawings in which.

DESCRIPTION OF THE PREFERRED EMBODIMENT

Figure 1:
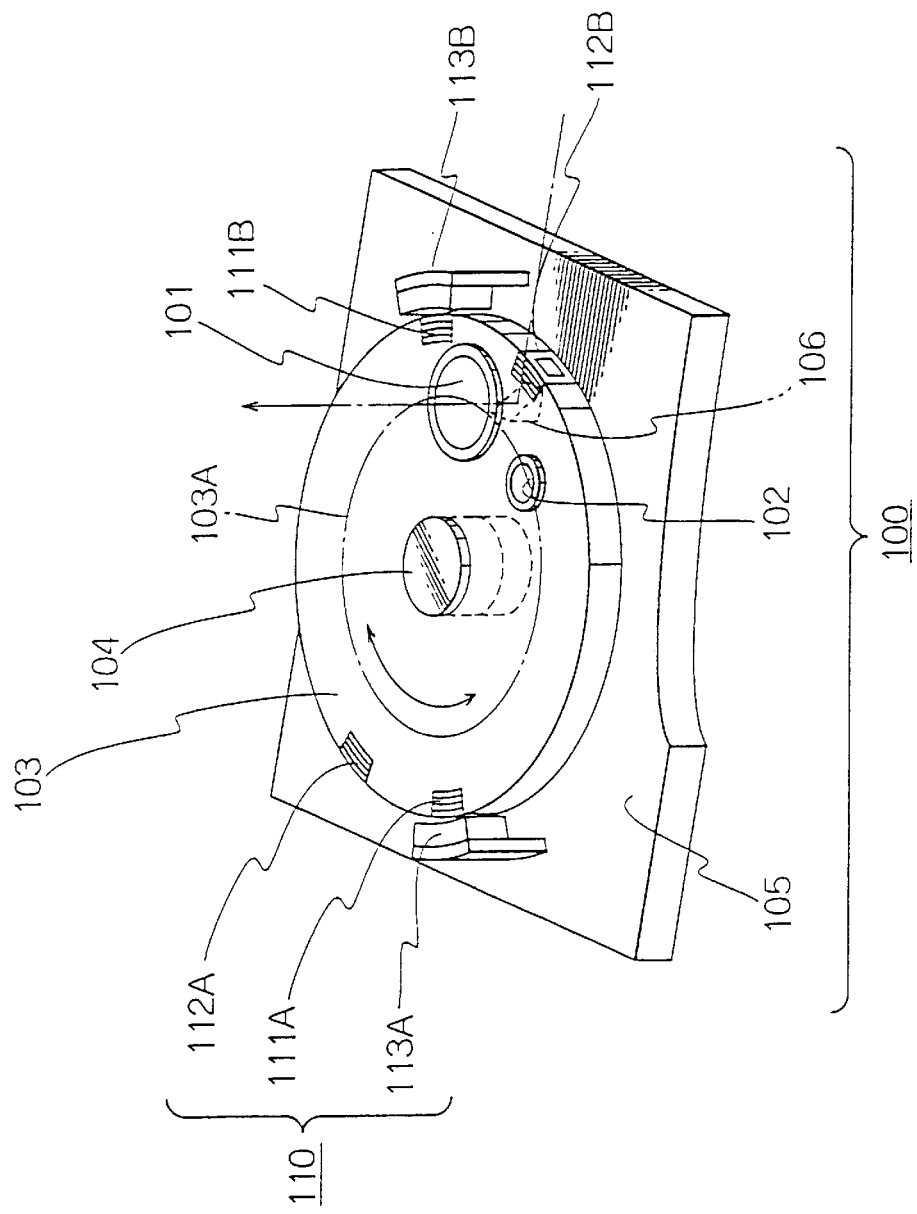
FIG. 1 is a perspective view showing a conventional objective lens actuator assembly.

To better understand the present invention, brief reference will be made to a conventional objective lens actuator assembly, shown in FIGS. 1, 2A and 2B. As shown, the actuator assembly, generally 100, includes an objective lens 101 assigned to DVDs and an objective lens 102 assigned to CDs. The lenses 101 and 102 are mounted on a disk-like lens holder 103 having an axis extending in the up-and-down direction as viewed in FIG. 1. The lenses 101 and 102 are arranged on the same circle on the lens holder 103. The lens holder 103 is mounted on a chassis 105 via a shaft 104 in such a manner as to be rotatable about the shaft 104 and movable in the direction parallel to the shaft 104. A focusing actuator, not shown, causes the lens holder 103 to move along the shaft 104. A tracking actuator 110 causes the lens holder 103 to rotate about the shaft 104 for thereby positioning the lenses 101 and 102. The focusing actuator and tracking actuator 110 are controlled by an operation control circuit, not shown. A mirror 106 is affixed to the chassis 105 and so positioned as to reflect a laser beam issuing from a light source, not shown, toward the recording surface of an optical disk, as indicated by an arrow in FIG. 1; that is, the mirror 106 is positioned on an optical path extending from the light source of an optical disk drive.

Specifically, the shaft 104 is positioned at the center of the disk-like lens holder 103. The objective lenses 101 and 102 are positioned side by side on a single circle 103A whose center is defined by the shaft 104. The laser beam reflected by the mirror 106 advances perpendicularly to the circle 103A. In this configuration, the lens holder 103 is rotatable about the shaft 104 in order to bring one of the lenses 101 and 102 into the optical path extending from the light source, depending on the kind of the optical disk loaded on the disk drive.

The tracking actuator 110 for rotating the lens holder 103 has a pair of tracking coils 111A and 111B, another pair of tracking coils 112A and 112B, and a pair of magnets 113A and 113B. The tracking coils 111A–112B are affixed to the circumferential edge of the lens holder 103. The magnets 113A and 113B are affixed to the chassis 105 and adjoin the circumferential edge of the lens holder 103.

Figure 2A:
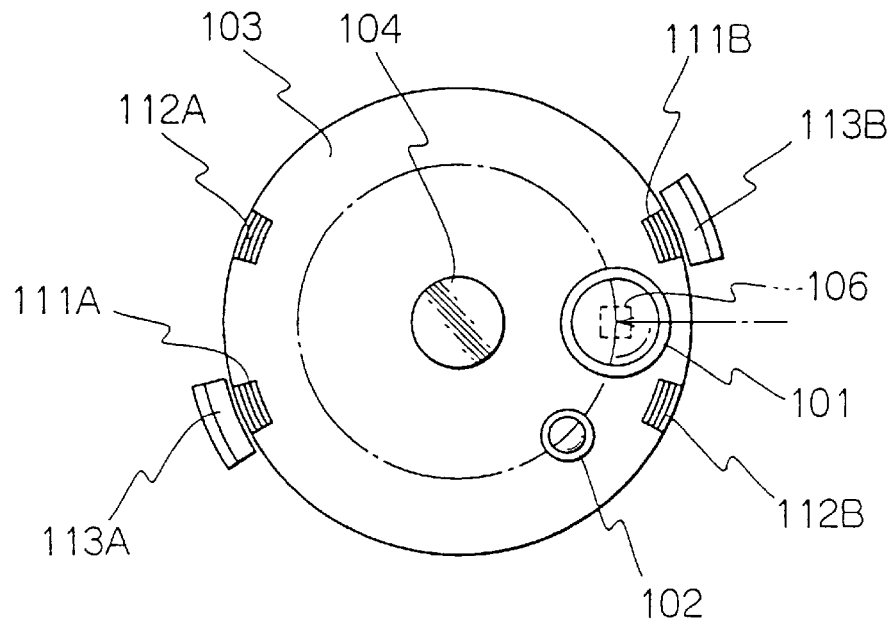
FIG. 2A shows the actuator assembly of FIG. 1 in a condition wherein one of two different objective lenses is located on an optical path.

As shown in FIG. 2A, when the pair of tracking coils 111A and 111B respectively face the magnets 113A and 113B, the lens 101 is positioned on the optical path along which the laser beam reflected by the mirror 106 advances. On the other hand, as shown in FIG. 2B, when the other pair of tracking coils 112A and 112B respective face the magnets 113A and 113B, the lens 102 is positioned on the above optical path. The tracking coils 111A–112B are so positioned as to selectively set up such conditions.

Usually, the tracking actuator 110 is used to correct, in the tracking direction, the positional deviation of a beam spot formed on an optical disk, i.e., to shift the lens 101 or 102 delicately in the above direction. Specifically, a direction tangential to the lens holder 103 and a direction tangential to the track of an optical disk are perpendicular to each other. When current fed to each pair of tracking coils is delicately controlled, the lens holder 103 is caused to move a small angular distance due to repulsion and attraction acting between the magnets 113A and 113B. As a result, the deviation of the beam spot on the optical disk is corrected in the tracking direction.

Figure 2B:
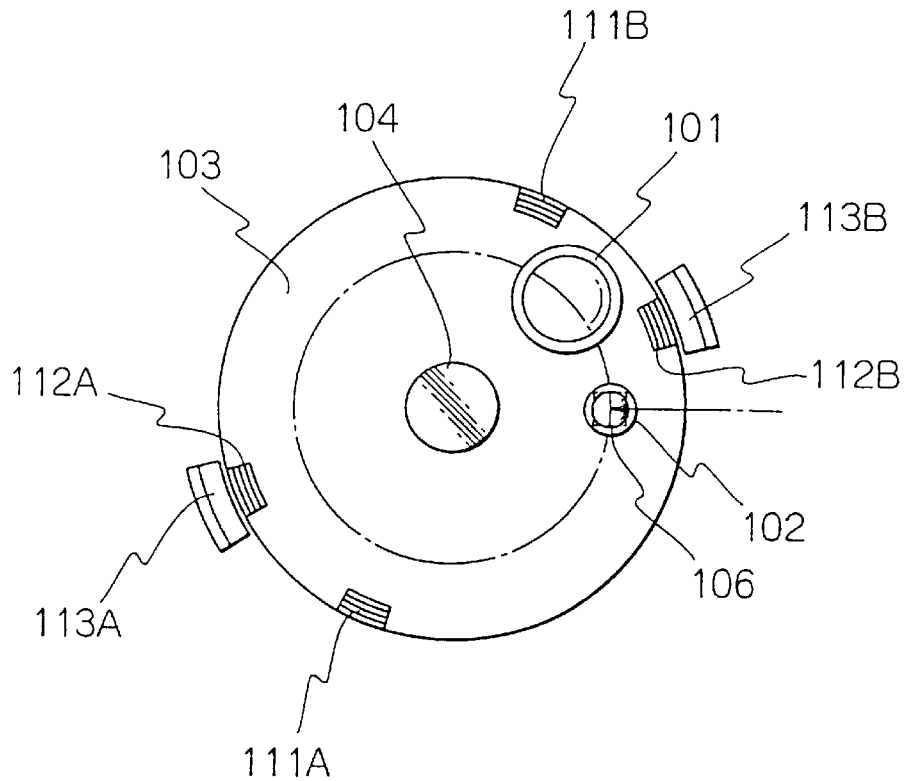
FIG. 2B shows the actuator assembly of FIG. 1 in a condition wherein the other objective lens is located on the optical path.

On the other hand, when great current (kick pulse) is instantaneously fed to the pair of tracking coils facing the magnets 113A and 113B, the lens holder 103 is caused to move a great angular distance from the position shown in FIG. 2A to the position shown in FIG. 2B, or vice versa. In this manner, the tracking actuator 110 is capable of correcting a tracking error and replacing the objective lens at the same time.

The lens holder 103 should preferably be light weight in order to reduce the influence of resonance ascribable to tracking and the influence of inertia ascribable to the replacement of the lens 101 or 102. However, the tracking coils 111A and 111B and the tracking coils 112A and 112B assigned to the lenses 101 and 102, respectively, increase the overall weight of the lens holder 103. Moreover, control for the tracking error correction and lens replacement must be executed with each of the two pairs of tracking coils, resulting in the need for two pairs of operation control circuits and two pairs of tracking coil switching circuits. This undesirably complicates the configuration of the overall operation control circuitry.

Figure 3:
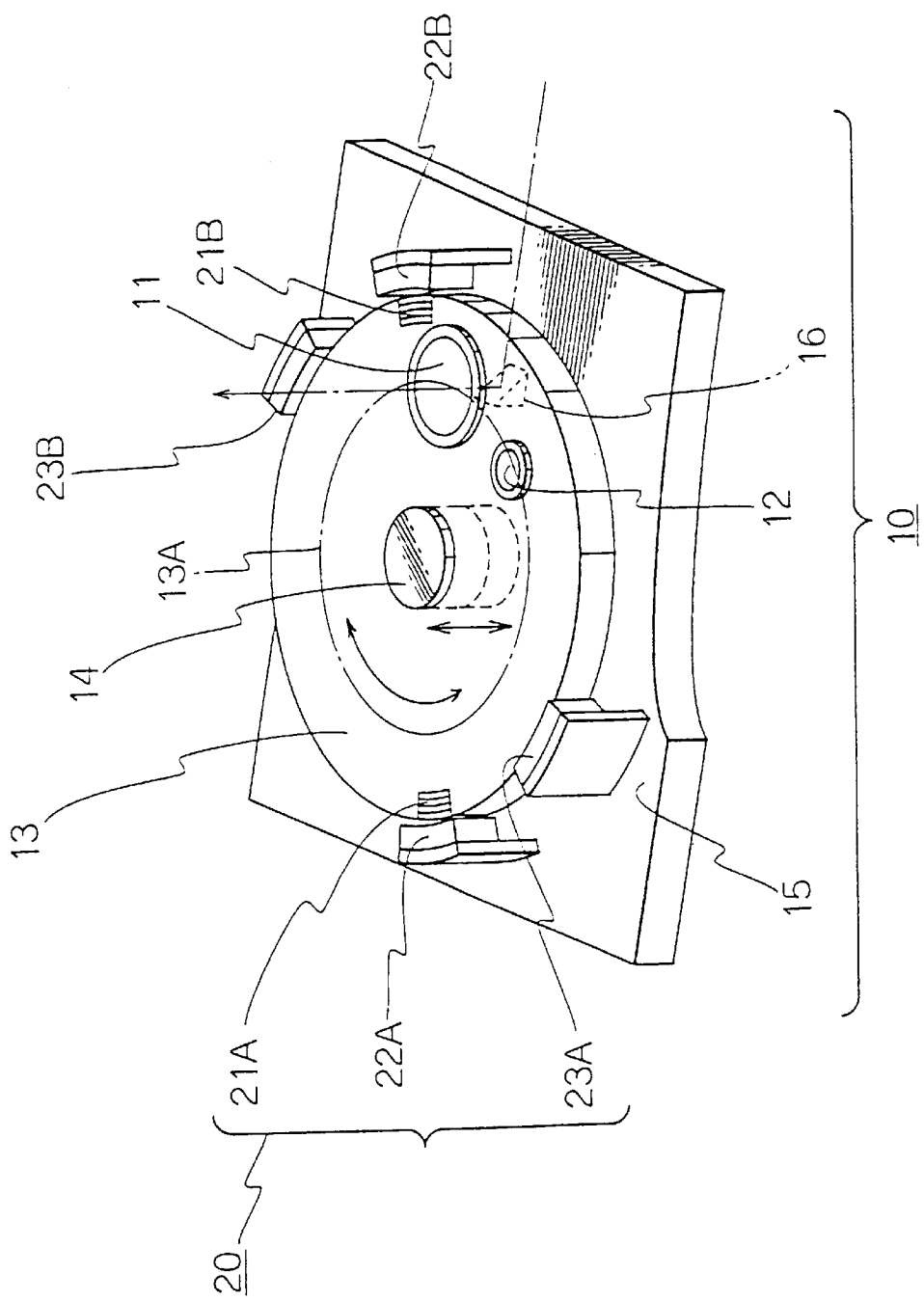
FIG. 3 is a perspective view showing an objective lens actuator assembly embodying the present invention.
Figure 4A:
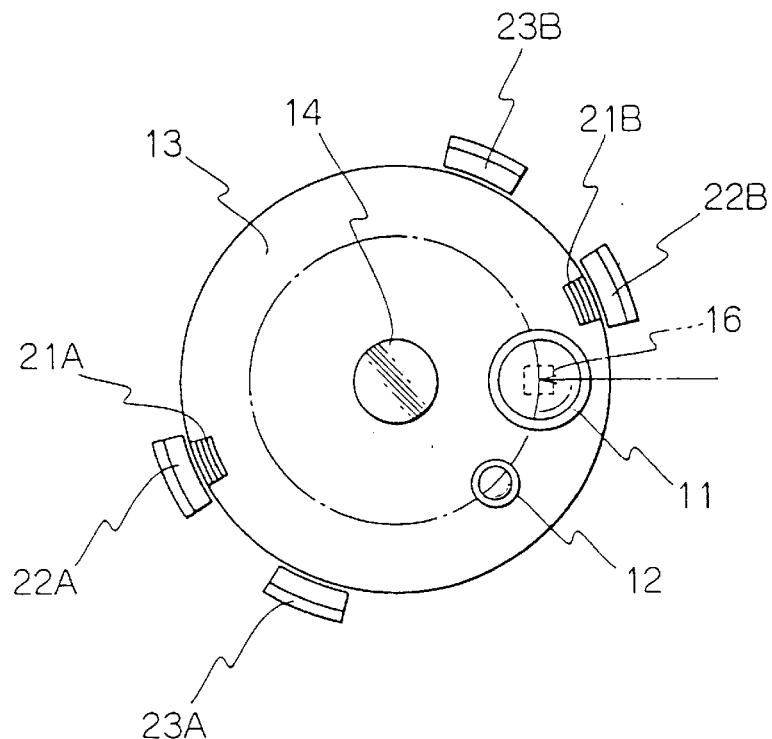
FIG. 4A shows the actuator assembly of FIG. 3 in a condition wherein one of two different objective lenses is located on an optical path.
Figure 4B:
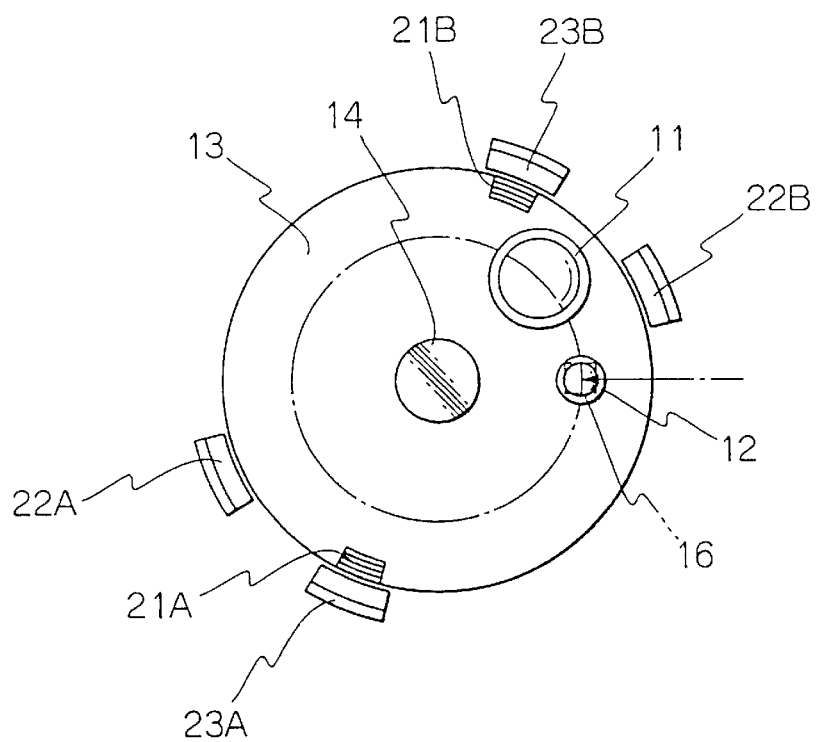
FIG. 4B shows the actuator assembly of FIG. 3 in a condition wherein the other objective lens is located on the optical path.

Referring to FIGS. 3, 4A and 4B, an objective lens actuator assembly embodying the present invention will be described. The actuator assembly is built in an optical disk drive capable of reading both CDs and DVDs, and arranged on an optical path extending from a light source included in the disk drive.

As shown in FIG. 3, the actuator assembly, generally 10, includes objective lenses 11 and 12 for converging a laser beam issuing from the light source onto the recording surface of a DVD and that of a CD, respectively. The lenses 11 and 12 are mounted on a disk-like lens holder 13 and positioned on a single circle 13A. The lens holder 13 is mounted on a chassis 15 via a shaft 14 in such a manner as to be rotatable about the shaft 14 and movable in the direction parallel the shaft 14. A focusing actuator, not shown, causes the lens holder 13 to move along the shaft 14. A tracking actuator 20 causes the lens holder 13 to rotate about the shaft 14 for thereby positioning the lenses 11 and 12. A mirror 16 is mounted on the chassis 15 below the lens holder 13. The mirror 16 has a reflecting surface so angled as to reflect a laser beam incident thereto from the right-hand side toward an optical disk, not shown, positioned above the actuator assembly 10, as indicated by an arrow in FIG. 3. An operation control circuit, not shown, is included in the actuator assembly 10 in order to control each of the focusing actuator and tracking actuator 20.

Specifically, the objective lens 11 assigned to a DVD whose substrate is comparatively thin has a large numerical aperture. By contrast, the objective lens 12 assigned to a CD whose substrate is comparatively thick has a small numerical aperture. The lenses 11 and 12 therefore each has a particular focal distance. The lenses 11 and 12 are respectively received in through holes formed in the disk-like lens holder 13, and are spaced by the same distance from the center of the lens holder 13. The shaft 14 extends upward from the chassis 15. The lens holder 13 is rotatably mounted on the upper portion of the shaft 14. The previously mentioned focusing actuator is arranged in the lower portion of the shaft 14. Specifically, the focusing actuator has a permanent magnet mounted on the lower end of the shaft 14, and a coil surrounding the magnet, although not shown specifically. The magnet and coil constitute an electromagnetic solenoid. Current to be fed to the coil is so controlled as to cause the shaft 14 and lens holder 13 to move up or down, as viewed in FIG. 3, by a small unit distance, thereby adjusting the focal distance.

The tracking actuator 20 causes the lens holder 13 to rotate about the shaft 14, as mentioned earlier. The tracking actuator 20 has a pair of tracking coils 21A and 21B and two pairs of magnets 22A and 22B and 23A and 23B. The tracking coils 21A and 21B are affixed to the circumferential edge of the lens holder 13 symmetrically to each other. The magnets 22A and 22B adjoin the circumferential edge of the lens holder 13 and face each other with the intermediary of the shaft 14. Likewise, the magnets 23A and 23B adjoin the above edge of the lens holder 13 and face each other with the intermediary of the shaft 14.

As shown in FIG. 4A, the magnets 22A and 22B are positioned such that when the tracking coils 21A and 21B respectively face the magnets 22A and 22B, the lens 11 is positioned on the optical path along which the laser beam reflected by the mirror 16 advances. As shown in FIG. 4B, the magnets 23A and 23B are positioned such that when the tracking coils 21A and 21B respectively face the magnets 23A and 23B, the other lens 12 is positioned on the above optical path.

A stop arrangement, not shown, is provided on the lens holder 13 in order to limit the range of rotation of the lens holder 13. The stop arrangement prevents the tracking coil 21A and magnet 22B or 23B from facing each other and prevents the tracking coil 21B and magnet 22A or 23A from facing each other.

The lens holder 13 is positioned such that a direction tangential to the holder 13 is perpendicular to a direction tangential to the track of an optical disk. The tracking actuator 20 corrects the deviation of the laser beam from a track by causing the lens holder 13 to move a small unit angular distance. Therefore, at the time of tracking, it is necessary for the lens holder 13 to rotate delicately with the tracking coils 21A and 21B facing, e.g., the magnets 22A and 22B. For this purpose, the tracking coils 21A and 21B each has a respective piece of iron at the inside thereof, although not shown specifically. The operation control circuit feeds current to the tracking coils 21A and 21B such that delicate repulsion occurs between each of the tracking coils 21A and 21B and the magnet facing it with the piece of iron of the former being attracted by the latter.

The actuator assembly 10 having the above construction is operated as follows. Assume that a DVD has been loaded on the disk drive, and that the actuator assembly 10 has been brought to the condition shown in FIG. 4A. Then, the mirror 16 reflects a laser beam incident thereto toward the recording surface of the DVD via the objective lens 11. The disk drive outputs a focus error signal and a track error signal on the basis of the laser beam converged onto the DVD. In response to these signals, the operation control circuit controls the focusing actuator and tracking actuator 20. Specifically, the focusing actuator causes the lens holder 13 to move up or down in the direction parallel to the shaft 14, thereby focusing the objective lens 11 to the DVD. Further, the current to be fed to the tracking coils 21A and 21B is delicately controlled in direction and intensity. As a result, the lens holder 13 moves a small unit angular distance, shifting the beam spot on the DVD in the direction perpendicular to the track of the DVD.

Assume that the DVD loaded on the disk drive is replaced with a CD. At this time, the lens holder 13 is so rotated as to bring the other objective lens 12 into the optical path. If desired, DVD/CD distinguishing means may be included in the disk drive in order to distinguish a DVD and a CD. In such a case, the disk drive may send a lens replace signal to the operation control circuit in response to the output of the distinguishing means. Alternatively, a command for causing the operation control circuit to replace the lens may be entered on inputting means provided outside of the disk drive.

For the replacement of the lens 11 with the lens 12, while the tracking coils 21A and 21B are held in the condition shown in FIG. 4A, great current (kick pulse) for causing the coils 21A and 21B and magnets 22A and 22B to repulse each other is instantaneously fed to the coils 21A and 21B. The repulsion overcomes the magnetic forces acting between the magnets 22A and 22B and the pieces of iron of the coils 21A and 21B, so that the lens holder 13 is caused to rotate. The coils 21A and 21B moved away from the magnets 22A and 22B, respectively, are brought to a stop when they face the other magnets 23A and 23B, as shown in FIG. 4B. As a result, the lens 12 is located on the optical path and ready to converge the laser beam onto the recording surface of the CD. In this condition, the focusing and tracking operation is effected with the CD in exactly the same manner as with the DVD, allowing the disk drive to read information out of the CD.

As stated above, in the illustrative embodiment, a pair of tracking coils 21A and 21B are mounted on the lens holder 13 while the magnets 22A and 22B and the magnets 23A and 23B assigned to the objective lenses 11 and 12, respectively, are arranged around the lens holder 13. This makes it needless to mount a number of tracking coils on the lens holder 13 in accordance with the number of objective lenses. Consequently, the lens holder 13 is light weight and obviates the influence of its inertia during rotation. Therefore, not only delicate tracking adjustment is achievable, but also power consumption by the tracking actuator 20 is reduced. In addition, it is possible to enhance high-speed operation.

If desired, three or more different kinds of objective lenses respectively assigned to different kinds of optical disks may be arranged on a single circle on the lens holder 13. In this case, it will be necessary to arrange three or more pairs of magnets on the chassis 15.

Further, two tracking coils 21A and 21B may be replaced with a single tracking coil only if magnets each corresponding to a particular objective lens are arranged on the chassis 15, but not in pairs. This successfully reduces the number of parts and further reduces the overall weight of the lens holder 13.

In summary, it will be seen that the present invention provides an objective lens actuator assembly for an optical disk drive and having various unprecedented advantages, as enumerated below.

(1) A single tracking coil is affixed to a lens holder while magnets each corresponding to a particular objective lens are arranged around the lens holder. This makes it needless to mount a number of tracking coils on the lens holder in accordance with the number of objective lenses, thereby reducing the overall weight of the lens holder.

(2) Tracking can be delicately adjusted under a minimum of influence of inertia of the lens holder in rotation. Power consumption by a tracking actuator is reduced. In addition, high-speed operation is achievable. Therefore, the actuator assembly reduces a period of time necessary for the disk drive to read information out of an optical disk.

(3) It is not necessary to control tracking error correction with each of a plurality of tracking coils heretofore mounted on the lens holder. This, coupled with the fact that control circuitry for the lens replacement is not necessary, simplifies the operation control circuit.

(4) The tracking coils and magnets are provided in symmetrical pairs at opposite sides of the axis of rotation of the lens holder; the pairs of magnets are each assigned to a particular objective lens. In addition, the lens holder biased from both sides with respect to its axis of rotation is free from inclination or similar undesirable displacement. This insures well-balanced rotation of the lens holder, and therefore desirable focusing and lens replacement.

(5) Two objective lenses each having a particular focal distance are mounted on the lens holder, so that the actuator assembly is operable with two different kinds of optical disks different in, e.g., thickness or material.

Various modifications will become possible for those skilled in the art after receiving the teachings of the present disclosure without departing from the scope thereof.

What is claimed is:

1. An objective lens actuator assembly for an optical disk drive selectively operable with a plurality of different types of optical disks, said assembly comprising:

a plurality of objective lenses wherein each of said lenses is operable with a different type of optical disk;

a lens holder supporting said plurality of objective lenses, said holder moveable between a plurality of positions equal in number to the number of said plurality of lenses, wherein each of said positions places a different one of said plurality of lenses in an optical path; and a tracking actuator to move said lens holder between said plurality of positions, said tracking actuator comprising at most one tracking coil, and a plurality of magnets equal in number to the number of said plurality of lenses, wherein each of said magnets is associated with a different one of said lenses, such that said lens holder is movable between said positions by magnetically attracting the tracking coil to a corresponding one of said magnets according to a selected one of said lenses.

2. The objective lens assembly according to claim 1 wherein said tracking coil is supported on said lens holder.

3. The objective lens assembly according to claim 1, wherein said lens holder is movable by rotation between said plurality of positions.

4. The objective lens assembly according to claim 1, further comprising a stop arrangement on the lens holder to limit the range of movement thereof when moving between positions.

5. The objective lens assembly according to claim 1, wherein each of said plurality of objective lenses has a different focal point which corresponds to a particular type of optical disk, each of said lenses being operable with said different type of optical disk by focusing a laser beam from a light source onto a recording surface of said optical disk.

6. An objective lens actuator assembly for an optical disk drive selectively operable with a plurality of different types of optical disks, said assembly comprising:

a plurality of objective lenses wherein each of said lenses is operable with a different type of optical disk;

a lens holder supporting said plurality of objective lenses, said holder moveable between a plurality of positions equal in number to the number of said plurality of lenses, wherein each of said positions places a different one of said plurality of lenses in an optical path; and a tracking actuator to move said lens holder between said plurality of positions, said tracking actuator comprising;

at most one pair of tracking coils, and a plurality of magnets pairs equal in number to the number of said plurality of lenses, wherein each of said magnet pairs is associated with a different one of said lenses, such that said lens holder is movable between said positions by magnetically attracting the pair of tracking coils to a corresponding pair of magnets according to a selected one of said lenses.

7. The objective lens assembly according to claim 6, wherein said pair of tracking coils is supported on said lens holder.

8. The objective lens assembly according to claim 6, wherein said lens holder is movable by rotation between said plurality of positions.

9. The objective lens assembly according to claim 6, further comprising a stop arrangement on the lens holder to limit the range of movement thereof when moving between positions.

10. The objective lens assembly according to claim 6, wherein each of said plurality of objective lenses has a different focal point which corresponds to a particular type of optical disk, each of said lenses being operable with said different type of optical disk by focusing a laser beam from a light source onto a recording surface of said optical disk.

11. An objective lens actuator assembly for an optical disk drive selectively operable with a plurality of different types of optical disks, said assembly comprising:

x lenses, wherein x is an integer greater than one, wherein each of said lenses is operable with a different type of optical disk;

a support structure holding said lenses and movable between x positions, each of said positions placing a different one of said lenses in an optical path;

y tracking coils; and x sets of y permanent magnets, wherein x and y are positive integers, wherein each set of y magnets is associated with a different one of said lenses, and said support structure is movable between said x positions by magnetically attracting said y tracking coils to a corresponding set of y magnets according to a selected one of said lenses.

12. The objective lens assembly according to claim 11, wherein y is equal to one.

13. The objective lens assembly according to claim 11, wherein y is equal to two.

14. The objective lens assembly according to claim 11, wherein said tracking coils are supported on said lens holder.

15. The objective lens assembly according to claim 11, wherein said lens holder is movable by rotation between said plurality of positions.

16. The objective lens assembly according to claim 11, further comprising a stop arrangement on the lens holder to limit the range of movement thereof when moving between positions.

17. The objective lens assembly according to claim 11, wherein each of said plurality of objective lenses has a different focal point which corresponds to a particular type of optical disk, each of said lenses being operable with said different type of optical disk by focusing a laser beam from a light source onto a recording surface of said optical disk.

* * * * *